PULSE RATE GENERATOR

MULTIVIBRATOR

Sept. 30, 1969 W. E. EGAN 3,470,032
SEA WATER BATTERY VOLTAGE CONTROL CIRCUIT
Filed Sept. 29, 1967 3 Sheets-Sheet 2

Sept. 30, 1969 W. E. EGAN 3,470,032

SEA WATER BATTERY VOLTAGE CONTROL CIRCUIT

Filed Sept. 29, 1967 3 Sheets-Sheet 3

United States Patent Office 3,470,032
Patented Sept. 30, 1969

---

3,470,032
SEA WATER BATTERY VOLTAGE CONTROL CIRCUIT
William E. Egan, Pittsfield, Mass., assignor, by mesne assignments, to the United States of America as represented by the Secretary of the Navy
Filed Sept. 29, 1967, Ser. No. 671,890
Int. Cl. H01m *11/00*
U.S. Cl. 136—160                           7 Claims

ABSTRACT OF THE DISCLOSURE

An electronic voltage control circuit which operates to maintain the output voltage of a sea water battery at its maximum value. An error voltage either positive or negative is generated indicating whether the battery output is above or below a reference voltage. This error voltage is converted into pulses which are fed to an electric motor, the motor in turn operating a valve which increases or decreases the flow of sea water through the battery compartment.

BACKGROUND OF THE INVENTION

The present invention relates to voltage control circuits and more particularly to voltage control circuits which are used to regulate the output of sea water batteries.

Batteries are made from two different materials which have electro-motive forces with respect to hydrogen normally of opposite polarity. A battery cell, or couple, will begin functioning, or have the capability of producing power, whenever the two materials forming a couple are connected by an electrolyte. Aqueous solutions of acids, bases or salts aresuitable for forming an electrolyte. The particular electrolyte used with a given couple is normally the one that produces the best performance from the materials from which the anode and cathode of the couple or cell are made.

Sea water contains a substantial proportion of various salts in solution. The amount of salt in solution in sea water ranges from ¾% to 4½% by weight of the water and, as a result, sea water can be used as the electrolyte in some types of batteries. Batteries which can use sea water as their electrolyte, generally referred to as sea water batteries, have many advantages over batteries using acids or bases as their electrolytes because of the natural abundance and distribution of materials which can serve as their electrolyte. As a consequence, sea water batteries, particularly those based on the magnesium, silver chloride couple, have found extensive use as a prime source of power in ordnance equipment such as propulsion and control of torpedoes, mine destructors, sonobuoys, life saving equipment, etc.

The sea water battery may be discharged only once and may not be recharged. Each cell of the sea water battery uses magnesium as the anode and silver chloride at the cathode, thin plates of these materials being separated by glass beads and stacked together to form a cell. The voltage output of the battery is determined by the number of cells stacked in series, and the current output depends on the cell area. The battery is activated at the moment the weapon or vehicle carrying the battery is launched, by the entry of sea water into the battery compartment. Sea water is forced into the battery through an opening scoop, the size of the scoop depending on the speed of the vehicle and the power rating of the battery. At launching, and during the run, sea water passes into the battery and out a discharge opening, by the combined effect of the scoop and the forward motion of the vehicle. This sea water flow flushes the evolved hydrogen, heat generated by the cell reaction, and soluble or insoluble reaction products from the battery. Removal of reaction by-products assures efficient operation of the battery.

Generally, when a sea water battery is used as a primary source of electric energy in ordnance equipment, for example, it is desirable to regulate the battery voltage as close as possible to an optimum value in order to optimize speed and distance the equipment employing this type of energy source will travel. Systems which have been used in the past to accomplish this regulatory function consisted of voltage sensitive relay switches which provide continuous correction regardless of error voltage magnitude. However, these prior art regulatory systems were highly undesirable because these relay systems caused over-shoot of the voltage with a resulting loss of power, over correction, and hunting.

SUMMARY

The present invention, which offers a material improvement over prior art voltage control circuits, is a completely electronic control circuit which operates quickly, accurately, and with a minimal amount of power consumption. The output voltage of the battery is compared with a reference value, and an error signal, either positive or negative, is established to indicate any variance between these two values. This error voltage is then shaped into square pulses which are used as propulsion forces for an electric servo motor. Since the output of a sea water battery is proportional to the amount of sea water electrolyte flowing across the cells, an accurate control of this seawater flow will likewise determine the output of the battery. The servo motor of this system which acts in response to the generated error signals, opens or closes a valve controlling the amount of sea water flowing through the compartment.

An object of the present invention is to provide a voltage control circuit for sea water batteries.

Another object is to provide a voltage control circuit which operates in response to a generated error signal.

Still another object is the provision of a voltage control circuit which regulates the flow of electrolyte through a sea water battery.

Still another object is the provision of a voltage control circuit which operates quickly, accurately, and uses a very small amount of power.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
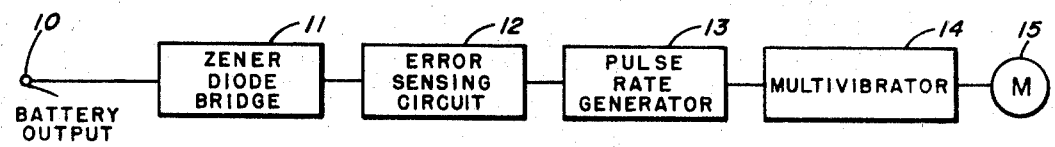
FIG. 1 shows a block diagram of the voltage regulator circuit.
Figure 6:
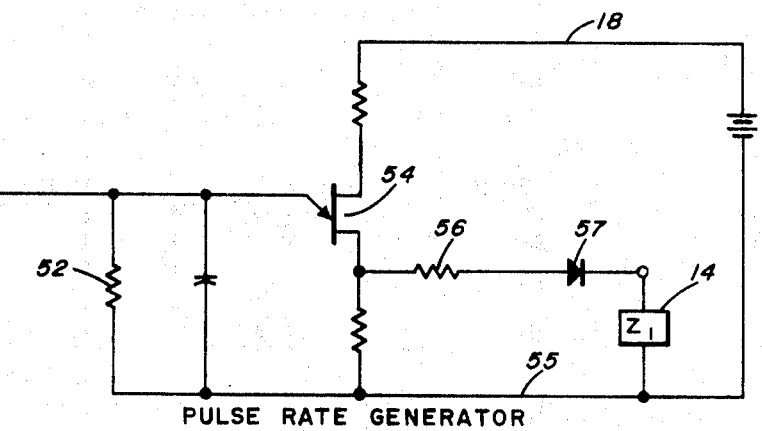
FIG. 6 shows an equivalent circuit for the positive half of the pulse rate generator.
Figure 7:
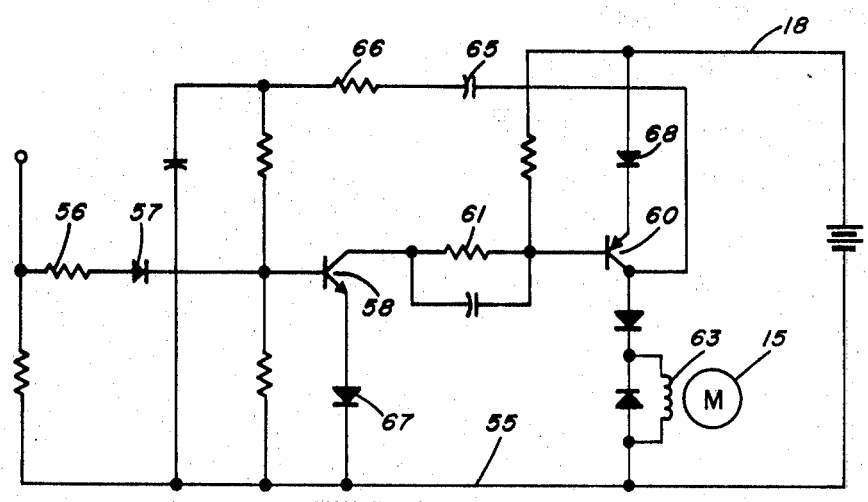
FIG. 7 shows an equivalent circuit for the positive half of the multivibrator circuit.

Referring now to the drawings, there is seen in FIG. 1 a block diagram of the complete voltage control circuit making up the invention. Input terminal 10 is utilized to apply the voltage output of the battery to the control circuit and in this situation should be in the neighborhood of 246 volts. Connected to input terminal 10 is a Zener diode bridge 11, the output of the bridge, in turn, being applied to an error sensing circuit 12, this being followed in turn by a pulse generator circuit 13 whose output is used to drive a multivibrator circuit 14, the output of which is used to energize a servo motor 15. Since the error voltage can be either positive or negative, depending upon whether the output of the battery is above or below the reference voltage, direction of rotation of servo motor 15 will depend upon the polarity of the voltage applied to it.

Figure 2:
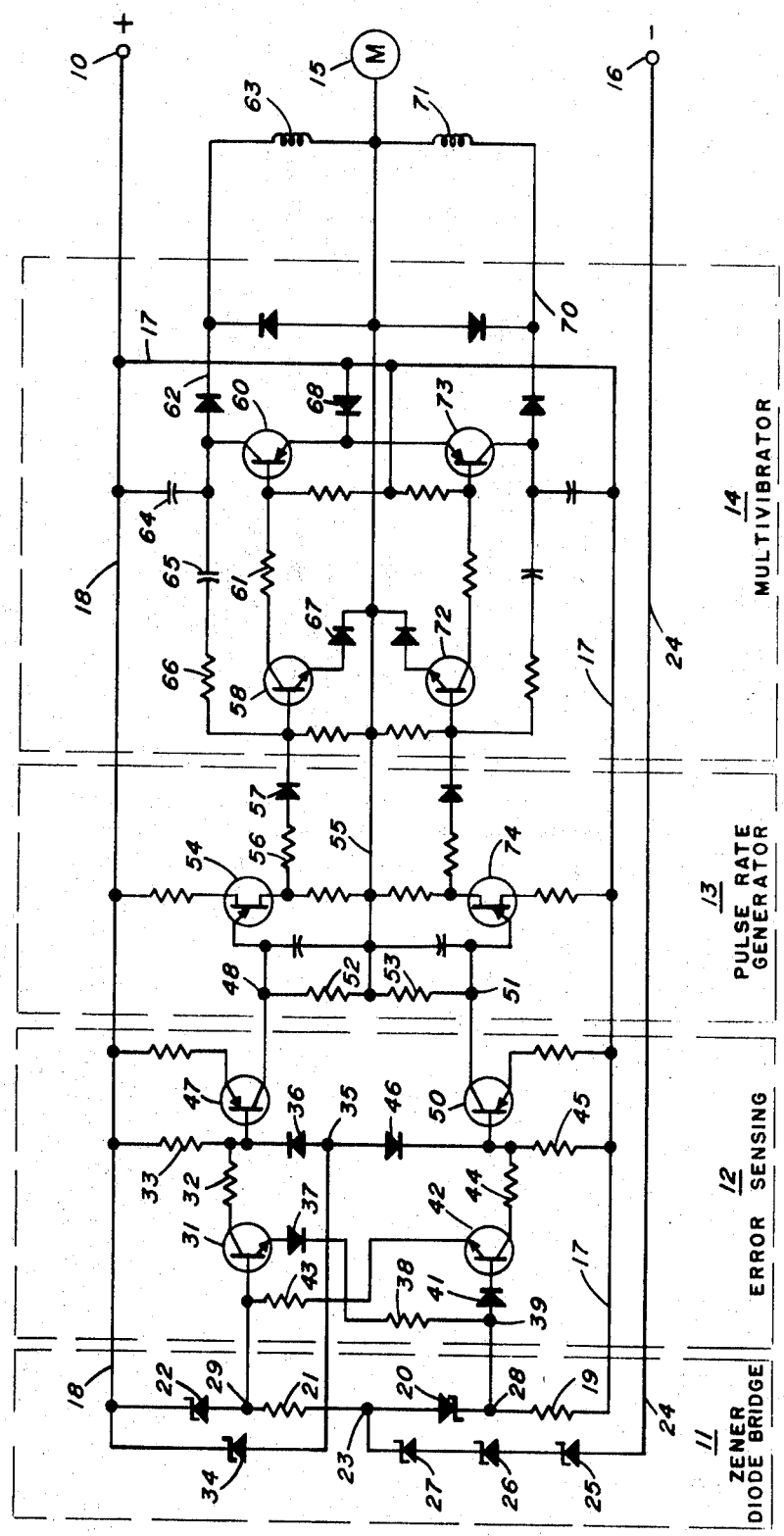
FIG. 2 shows a detailed schematic of the overall circuit.
Figure 3:
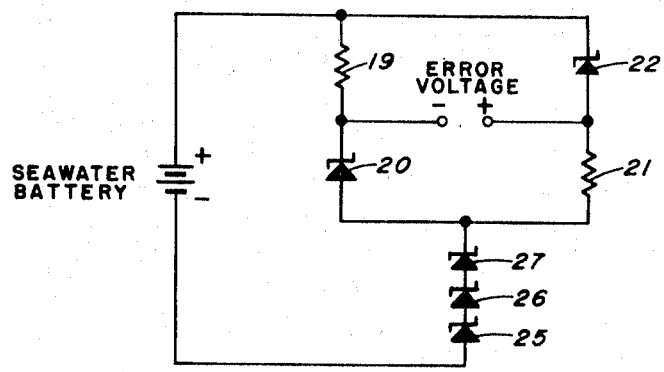
FIG. 3 shows an equivalent circuit for the Zener diode bridge.
Figure 4:
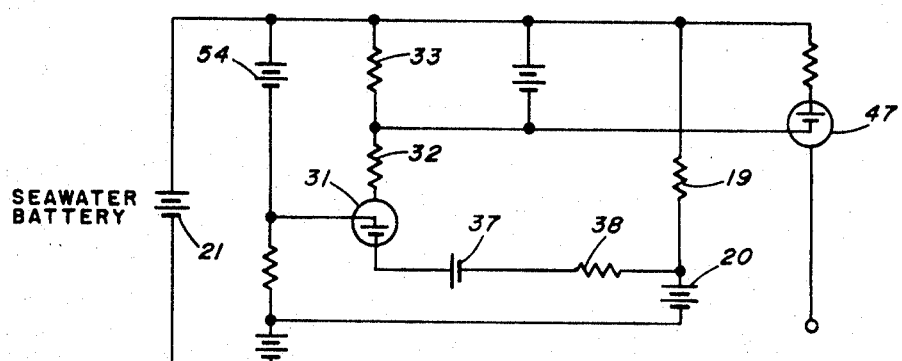
FIG. 4 shows an equivalent circuit for the positive half of the error sensing circuit.
Figure 5:
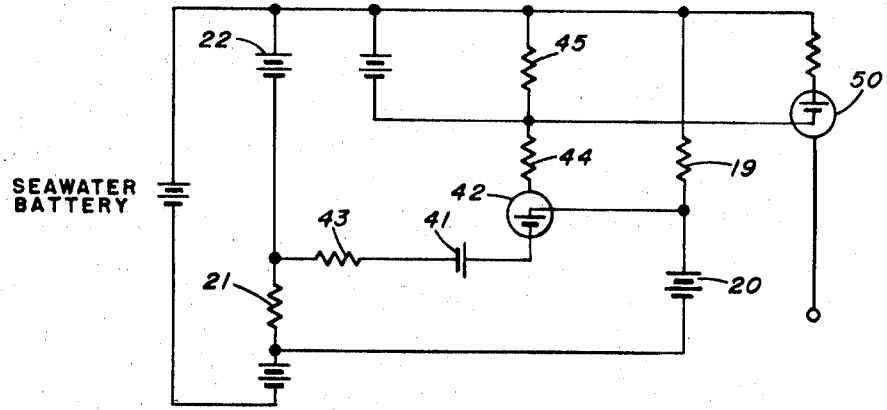
FIG. 5 shows an equivalent circuit for the negative half of the error sensing circuit.

In FIG. 2 there is shown a circuit diagram of the complete control circuit with the component boxes of FIG. 1, such as the Zener diode bridge, error sensing circuit, pulse generator, and multivibrator circuit marked off in dotted lines. As the description progresses it may be helpful to refer to the equivalent circuits of FIGS. 3–7 for a better understanding of the operation of the invention. Battery terminals 10 and 16 are used to connect across the output of the sea water battery whose output is to be regulated, terminal 10 being used for the positive side of the battery, and terminal 16 being used for the negative side, thereby providing a voltage $V_B$ in the neighborhood of 246 volts.

Connected to positive terminal 10, there are two leads 17 and 18 which are used to apply positive potential to the Zener diode bridge 11, lead 17 being connected to a resistor 19 which in turn is connected to a Zener diode 20. The other positive lead, 18, is connected to a Zener diode 22 which in turn is connected to a resistor 21, the output of resistor 21 being connected to a junction 23, this junction also being connected to Zener diode 20. The negative terminal 16, on the other hand, is connected by means of lead 24 to three series-connected Zener diodes 25, 26 and 27, the output of 27 being tied to a junction 23. By reference to the equivalent circuit of FIG. 3, it can be seen that this arrangement of components results in the bridge circuit having resistor 19 and Zener diode 20 forming one arm of the bridge and resistor 21 and Zener diode 22 forming the other arm of the bridge, with an output voltage being produced across junctions 28 and 29. This potential produced between potentials 28 and 29 is an error voltage resulting from a comparison of the potentials on inputs 10 and 16 and may vary in polarity between either plus or minus values, terminal 29 producing a plus error signal and junction 28 producing a negative error signal.

Connected so as to receive the positive error signal from junction 29 is the base electrode of an NPN transistor 31, the collector of which is connected by means of resistors 32 and 33 to positive potential line 18. Also connected to positive lead 18 is a Zener diode 34 whose anode is connected to junction 35, junction 35 in turn being connected to diode 36 so as to apply potential to the common junction between resistors 32 and 33. The emitter of transistor 31 leads through a diode 37 and a resistor 38 to a terminal 39, terminal 39 in turn being connected to the cathode of a diode 41, this in turn leading to the base of the NPN transistor 42. The emitter of transistor 42 is cross connected by a resistance 43 to the base of transistor 31. The collector of transistor 42 leads by a resistance 44 to the common terminal between a resistance 45 and a diode 46, the other terminal of resistance 45 being connected to positive lead 17, the cathode of diode 46 being connected to junction 35. It will be noted that since junction 28 and junction 39 are connected by means of a straight lead that a negative error signal appearing on junction 28 is applied to the base terminal of NPN transistor 42. From the output end of resistor 32, the positive error signal is applied to the base of a PNP transistor 47, the emitter of which is connected by a resistance to positive lead 18 and the collector leads to a junction 48. Likewise, the output end of resistor 44 applies the negative error signal to the base of a PNP transistor 50, the emitter of which is connected to the positive lead 17 and the collector of which goes to a junction 51. Connected between the collectors of transistors 47 and 50 are two resistances, 52 and 53. For a better understanding of the circuitry involved in error sensing circuit 12, just described, reference is made to FIG. 4 for an equivalent circuit of the positive half of the error sensing circuit and to FIG. 5 for the negative equivalent circuit.

In describing the structure of pulse rate generator 13 and multivibrator 14, for the sake of simplicity, only one of the error signal channels will be described, since both of these channels operate in the same manner. The positive error signal appearing at junction 48 is applied to the emitter of a unijunction or double-base diode 54, one base of which leads to the positive lead 18 while the other base connects to a reference lead 55. The output of unijunction 54 as appeairng on base No. 2 is applied by series connected resistor 56 and diode 57 to the base of an NPN transistor 58. The output of transistor 58 as presented on its collector electrode is impressed by a series resistance 61 upon the base electrode of an NPN transistor 60, the collector of this transistor in turn benig connected to positive lead 62. The signal on output lead 62 is impressed upon one of the coil windings of motor 15. Formnig a feedback circuit between the output of transistor 60 and the input of transistor 58 is a capacitor 65 and a resistor 66. A diode 67 connects the emitter of transistor 58 to reference lead 55, while a diode 68 connects the emitter of transistor 60 with positive lead 17.

As stated previously, the negative error signal channel has a structure similar to that of the positive channel. Therefore, for the negative channel unijunction transistor 74 functions as a pulse rate generator while transistors 72 and 73 act as a one-shot multivibrator to produce a negative signal on output lead 70, this lead applying a potential to coil 71 of motor 15 to produce a rotation in the opposite direction from that produced by coil 63.

Turning now to the operation of the invention, it should be recalled that the voltage controlled circuit is designed to detect positive or negative error voltage with respect to optimum battery voltage, which in this case is 246 volts. The series-string of Zener diodes 25, 26 and 27 is used to prevent operation of circuit until the battery voltage impressed upon terminals 10 and 16 reaches approximately 186 volts. A Zener diode bridge consisting of resistance 19 and Zener diode 20 in one arm and resistance 21 and Zener diode 22 in the other arm completes the series arrangement of Zener diodes 25, 26 and 27 to provide the 246 volts reference point. An output is produced by the bridge and a potential will appear at junctions 28 or 29 depending upon the unbalance of the bridge with the reference voltage, this output therefore representing an error voltage and may be either positive or negative. The error voltages from junctions 28 and 29 are impressed upon an error sensing circuit 12 of which transistors 31 and 47 make up the positive portion of the channel and transistors 42 and 50 comprise the negative side. These four transistors 31, 47, 42 and 50 are used in conjunction with the Zener diode bridge to produce an error current which is proportional to the error voltage. Error current flows in one or the other of the two channels, either positive channel or negative channel, depending upon the polarity of the error voltage. The output of the error sensing circuit 12 is applied to the pulse rate generator circuit 13, and in each channel a unijunction transistor is used to produce pulses at a rate proportional to the error current. Therefore, in the positive channel, unijunction transistor 54 produces pulses proportional to the error current generated by transistors 31 and 47. On the negative side unijunction 74 poduces pulses proportional to the negative error current produced by transistors 42 and 50.

From the pulse rate generator circuit 13 a signal is applied to multivibrator circuit 14 and each pulse from the pulse rate generator triggers a one shot multivibrator circuit consisting of two transistors which produce a square wave voltage pulse across a servo motor 15. Therefore, in the positive channel transistors 58 and 60 make up a one-shot power multivibrator which is triggered from a signal from unijunction transistor 54 to produce a square voltage pulse on output 62 which is applied to winding 63 of motor 15. Likewise, in the negative channel transistors 72 and 73 make up a one-shot multivibrator which is triggered by unijunction 74 to produce a negative square wave pulse on output lead 70, this pulse being applied to coil 71 of motor 15. These pulses are normally of 26 volt magnitude for a duration of approximately 0.2 of a second, the direction of motor rotation being dependent upon which channel delivers the pulse. Servo motor 15 controls a valve (not shown) which regulates the flow of seawater through the battery, which in turn serves to regulate the sea water battery output voltage.

From the above description of the structure and operation of the present device, it is clear that the invention provides a new and improved electronic regulator to regulate the output voltage of a seawater battery so that it is at an optimum value at all times. The invention eliminates voltage relays which are power consuming and provides a device which quickly and accurately makes corrections dependent upon error voltage magnitude. An improvement over prior art voltage regulators is offered by the invention in the new and unique manner in which voltage errors are converted to proportional current flow for control of a pulse source error correction cicuit.

Obviously, many modifications and variations of the present invention are possible in the light of the above teachings. It is therefore to be understood that within the scope of the appended claims, the invention may be practiced otherwise than as specifically described.

What is claimed is:

1. A voltage control circuit in combination with a sea water battery for maintaining the output of the sea water battery at its optimum valve comprising:
   input means for applying the potential of the battery;
   bridge means for generating an error voltage indicative of whether the battery voltage is above or below optimum value;
   error sensing means for producing error currents proportional to the error voltages;
   pulse generating means connected to the error sensing means;
   multivibrator means connected to the pulse generating means;
   motor means driven by the multivibrator means; and
   valve means activated by the motor to regulate the flow of sea water into the battery.

2. The device of claim 1 wherein the bridge means consists of a series-parallel arrangement of Zener diodes for generating either a positive or negative error signal.

3. The device of claim 2 wherein the error sensing means has a channel for positive error signals and a channel for negative error signals.

4. The device of claim 3 wherein the error sensing means has two series connected transistors for each channel.

5. The device of claim 4 wherein the pulse generating means has a unijunction transistor for each channel for producing pulses at a rate proportional to the error current impressed on that channel.

6. The device of claim 5 wherein the multivibrator means has a two transistor one-shot power multivibrator circuit for each channel.

7. The device of claim 6 wherein the motor means has a plurality of driving coils, a coil being connected to the multivibrator circuit of each error channel so that forward or reverse rotation of the motor results from which error channel is activated.

References Cited

UNITED STATES PATENTS 3,012,087   12/1961   Billiard et al. _____ 136—160

WINSTON A. DOUGLAS, Primary Examiner

D. L. WALTON, Assistant Examiner

U.S. Cl. X.R.

136—100, 181